US011429398B2

(12) United States Patent
Yamazaki

(10) Patent No.: US 11,429,398 B2
(45) Date of Patent: Aug. 30, 2022

(54) CHANGE PROCEDURE GENERATION DEVICE, CHANGE PROCEDURE GENERATION METHOD, AND CHANGE PROCEDURE GENERATION PROGRAM

(71) Applicant: NEC Corporation, Tokyo (JP)

(72) Inventor: Satoshi Yamazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 247 days.

(21) Appl. No.: 16/620,945

(22) PCT Filed: May 31, 2018

(86) PCT No.: PCT/JP2018/021041
§ 371 (c)(1),
(2) Date: Dec. 10, 2019

(87) PCT Pub. No.: WO2018/230352
PCT Pub. Date: Dec. 20, 2018

(65) Prior Publication Data
US 2020/0210208 A1 Jul. 2, 2020

(30) Foreign Application Priority Data
Jun. 14, 2017 (JP) .............................. JP2017-116729

(51) Int. Cl.
G06F 9/44 (2018.01)
G06F 9/445 (2018.01)
G06F 8/60 (2018.01)

(52) U.S. Cl.
CPC ............ *G06F 9/44505* (2013.01); *G06F 8/60* (2013.01)

(58) Field of Classification Search
CPC ................. G06F 1/32; G06F 1/12; G06F 9/44
See application file for complete search history.

(56) References Cited

U.S. PATENT DOCUMENTS 6,098,098 A * 8/2000 Sandahi ................ H04L 41/082
709/221
6,598,069 B1 * 7/2003 Rooney ................. G06F 9/5077
718/104

(Continued)

FOREIGN PATENT DOCUMENTS

JP 5305040 B2 10/2013
JP 2014/142678 A 8/2014

(Continued)

OTHER PUBLICATIONS

International Search Report for PCT Application No. PCT/JP2018/021041, dated Aug. 21, 2018.

(Continued)

*Primary Examiner* — Keshab R Pandey

(57) ABSTRACT

A change procedure generation device 10 includes: an extraction unit 11 that inputs first configuration information, which is information indicating the configuration before a change of a system to be changed, and second configuration information, which is information indicating the change target configuration of the system to be changed, and extracts constituent elements of the system to be changed, which are included in both the first configuration information and the second configuration information, from the first configuration information and the second configuration information, respectively; and a generation unit 12 that generates state elements representing respective states of the two constituent elements according to a predetermined condition on the basis of the two extracted constituent elements.

5 Claims, 14 Drawing Sheets

(56) References Cited

U.S. PATENT DOCUMENTS

| | | | |
|---|---|---|---|
| 9,298,847 B1* | 3/2016 | Rohde | G06F 16/90 |
| 2004/0153869 A1* | 8/2004 | Marinelli | G06F 8/61 |
| | | | 714/47.1 |
| 2007/0180052 A1* | 8/2007 | Zomaya | G06F 8/64 |
| | | | 709/217 |
| 2012/0109900 A1* | 5/2012 | Sahibzada | G06Q 30/0201 |
| | | | 707/687 |
| 2013/0138998 A1 | 5/2013 | Ichikawa et al. | |
| 2014/0207920 A1* | 7/2014 | Hirana | H04L 41/0803 |
| | | | 709/220 |
| 2015/0242284 A1* | 8/2015 | Ignatius | G06F 11/1448 |
| | | | 707/752 |
| 2015/0280981 A1* | 10/2015 | Sasada | H04L 41/0853 |
| | | | 709/222 |
| 2015/0323916 A1 | 11/2015 | Kuroda et al. | |
| 2016/0203007 A1 | 7/2016 | Ueno | |
| 2018/0165158 A1* | 6/2018 | Raghavan | G06F 8/00 |
| 2018/0225133 A1 | 8/2018 | Kuroda | |
| 2019/0139332 A1* | 5/2019 | Antonsson | G06F 8/355 |

FOREIGN PATENT DOCUMENTS

| | | |
|---|---|---|
| JP | 2015-215885 A | 12/2015 |
| JP | 2015-215887 A | 12/2015 |
| JP | 2016-126693 A | 7/2016 |
| WO | 2017/033441 A1 | 3/2017 |

OTHER PUBLICATIONS

Kuroda, Takayuki et al., Adding Exchangeability of Deployment Agent to Template-based Provisioning, IPSJ SIG Technical Reports, Feb. 25, 2016, vol. 2016-IOT-32, No. 25, pp. 1-8, ISSN 2188-8787, Japan.

Japanese Office Action for JP Application No. 2019-525304 dated May 19, 2020 with English Translation.

* cited by examiner

FIG. 3

```
system TargetSystem version 1:
    component UbuntuAnsible VM1:
        ip: "xxx.xxx.xxx.xxx"
        imageId: "zzzz"
    component App AP:
        property port: 8080
        os->@VM1.osAnsible
```

```
system TargetSystem version 2:
    component UbuntuAnsible VM2:
        ip: "yyy.yyy.yyy.yyy"
        imageId: "zzzz"
    component App AP:
        property port: 8080
        os->@VM2.osAnsible
```

FIG. 4

```
component App version 1:
   property String port: "80"
   property String packageName: "app"
   reference OS[] os:
      packages: [@package]
      services: [@service]
   element OSPackage package:
      name: @packageName
   element OSService service:
      port: @port
      name: @packageName
      f->t:
         depends: [@package(t)]
```

FIG. 5

```
element OSService version 1:
   property String port: "80"
   property String name: "app"
   agent: null
```

```
agent Ansible:
   property String hostIp: "xxx"
   property String hostName: ""
```

FIG. 6

```
mergePolicy osServicePolicy:
targetElement: OSService service
condition:
  If (serviceBefore.agent.hostName != serviceAfter.agent.hostName):
    elements: different
    beforeStates: (current, require)=(t,f)
    afterStates: (current, require)=(f,t)
  else:
    elements: same
    states: (current, require)=(t,t)
```

FIG. 7

```
mergePolicy osFilePolicy:
    targetElement: OSFile file
    condition:
        If (file.trans(f->t).depends.isEmpty?):
            elements: same
            states: (current, require)=(u, t)
        else if fileBefore.dir != fileAfter.dir :
            elements: different
            beforeStates: (current, require)=(t, f)
            afterStates: (current, require)=(f, t)
        else:
            elements: same
            if fileBefore.port==fileAfter.port:
                states: (current, require)=(u, t)
            else:
                states: (current, require)=(t, t)
```

CHANGE PROCEDURE GENERATION DEVICE, CHANGE PROCEDURE GENERATION METHOD, AND CHANGE PROCEDURE GENERATION PROGRAM

This application is a National Stage Entry of PCT/JP2018/021041 filed on May 31, 2018, which claims priority from Japanese Patent Application 2017-116729 filed on Jun. 14, 2017, the contents of all of which are incorporated herein by reference, in their entirety.

TECHNICAL FIELD

The present invention relates to a change procedure generation device, a change procedure generation method, and a change procedure generation program, more particularly to a change procedure generation device, a change procedure generation method, and a change procedure generation program capable of generating a procedure for redeployment of an application to a different deployment destination, such as migration of a virtual machine.

BACKGROUND ART

In order to efficiently change the configuration of software or a system in a short time, it is required to reduce the labor of a system administrator and the labor of an operator in charge of the change at the time of system change and the influence, at the time of the system change, on users of the system to be changed.

In order to build a system that satisfies various system requirements, it is required to prepare many types of modules constituting the system and many types of configuration change operations.

When there is dependency between modules constituting the system, the order of change operation for each module is required to satisfy a predetermined condition. That is, the change operation is more complicated than that in the case where there is no dependency.

The dependency between modules represents the order relation in setting between two elements, such that a properly functioning module B is required for a module A to properly function. An administrator, who is responsible for preventing a system failure from occurring in the middle of the change of system configuration, is required to always consider the order relation as described above.

A system that automatically generates an operation plan necessary for changing a system in consideration of the dependency as described above is called a change management system. For example, information on the dependency between parts and information on the operation for a part are preliminarily defined in the change management system.

The above-described change management system enables the administrator to efficiently generate an operation procedure that is effective in executing complicated change operation. In addition, an operator can efficiently perform operation on the basis of the generated effective operation procedure. When the change operation is performed by using the operation procedure generated by the change management system, the operation is efficiently performed without taking extra time, so that reduction of the influence on users of a system to be changed can be expected.

Many related researches and related products have already been known in relation to the change management system as described above. For example, Patent Literature (PTL) 1 describes a change plan system that defines the dependency between operation states of parts and generates a change procedure necessary for change operation.

The change plan system described in PTL 1 can handle an application running on a physical machine or a virtual machine, and a setting file for the application as a part constituting the system.

In addition, the change plan system described in PTL 1 can also handle operations related to setting for cloud base software constituting the base of a virtual machine and a communication network as a part constituting the system. When a method of describing an interface between components and the information propagation processing method are used, the input information described in PTL 1 is described more simply.

Operation of changing system configuration includes an operation of redeployment of a virtual machine to a physical machine different from a physical machine in which the virtual machine has operated, such as migration of the virtual machine. For example, PTL 2 describes a method of efficiently executing migration of a virtual machine.

CITATION LIST

Patent Literature

PTL 1: Japanese Patent Application Laid-Open No. 2015-215885
PTL 2: Japanese Patent No. 5305040

SUMMARY OF INVENTION

Technical Problem

In system building using the change plan system described in PTL 1, the description of input information to a change plan system for deriving an execution order of a procedure for changing the deployment destination of an application or a setting file is complicated.

The change plan system described in PTL 1 computes information having different component names as difference information by comparing a current system configuration information before change to change target system configuration information. The change plan system described in PTL 1 searches for a change procedure by using the computed difference information.

When a virtual machine is migrated, an administrator who uses the change plan system described in PTL 1 is required to explicitly describe the fact that the virtual machine operates in a new physical machine to a name of a component in addition to information representing the new physical machine to which the virtual machine is redeployed.

That is, the administrator is required to describe redundant information. Even when using a system building method with the change plan system described in PTL 1 by using the above-described information propagation method, the administrator is required to describe redundant information.

The method described in PTL 2 can migrate a virtual machine without using useless information. Unfortunately, it is difficult to perform the migration at one time together with minor setting change of a communication network and an application by the method described in PTL 2.

In order to solve the above-described problems, the object of the invention is to provide a change procedure generation device, a change procedure generation method, and a change procedure generation program capable of generating a procedure for changing system configuration on the basis of simple input information.

Solution to Problem

A change procedure generation device according to the invention includes: an extraction unit which inputs first configuration information, which is information indicating the configuration before a change of a system to be changed, and second configuration information, which is information indicating the change target configuration of the system to be changed, and extracts constituent elements of the system to be changed, which are included in both the first configuration information and the second configuration information, from the first configuration information and the second configuration information, respectively; and a generation unit which generates state elements representing respective states of the two constituent elements according to a predetermined condition on the basis of the two extracted constituent elements.

A change procedure generation method according to the invention includes: inputting first configuration information, which is information indicating the configuration before a change of a system to be changed, and second configuration information, which is information indicating the change target configuration of the system to be changed, extracting constituent elements of the system to be changed, which are included in both the first configuration information and the second configuration information, from the first configuration information and the second configuration information, respectively; and generating state elements representing respective states of the two constituent elements according to a predetermined condition on the basis of the two extracted constituent elements.

A change procedure generation program according to the invention causes a computer to perform: extraction processing of inputting first configuration information, which is information indicating the configuration before a change of a system to be changed, and second configuration information, which is information indicating the change target configuration of the system to be changed, and extracting constituent elements of the system to be changed, which are included in both the first configuration information and the second configuration information, from the first configuration information and the second configuration information, respectively; and generation processing of generating state elements representing respective states of the two constituent elements according to a predetermined condition on the basis of the two extracted constituent elements.

Advantageous Effects of Invention

According to the invention, a procedure for changing system configuration can be generated on the basis of simple input information.

BRIEF DESCRIPTION OF DRAWINGS

FIG. 3 is an explanatory diagram showing an example of system configuration information of the first exemplary embodiment.

FIG. 4 is an explanatory diagram showing an example of component information of the first exemplary embodiment.

FIG. 5 is an explanatory diagram showing an example of constituent element detailed information of the first exemplary embodiment.

FIG. 6 is an explanatory diagram showing an example of comparison policy information of the first exemplary embodiment.

FIG. 7 is an explanatory diagram showing another example of the comparison policy information of the first exemplary embodiment.

DESCRIPTION OF EMBODIMENTS

Figure 1:
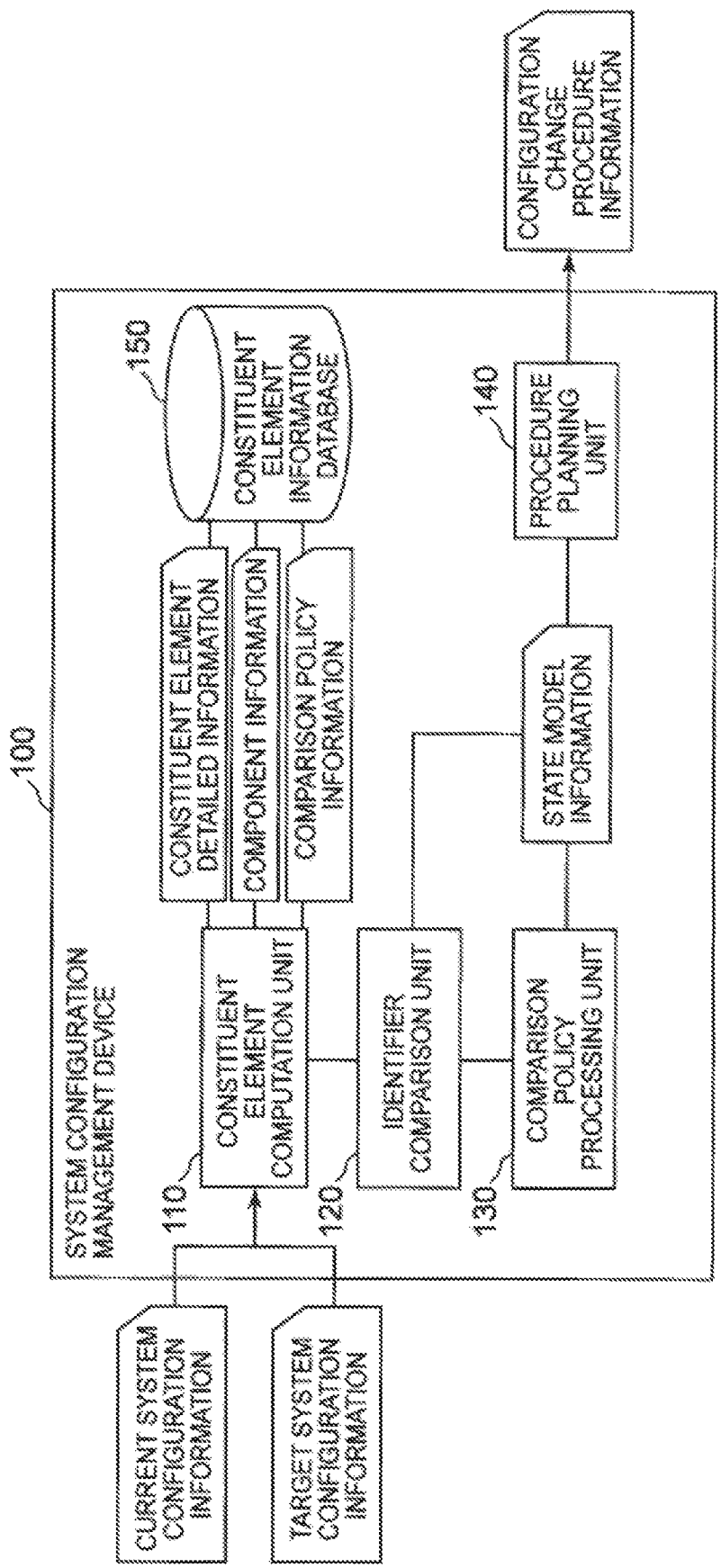
FIG. 1 is a block diagram showing a configuration example of a first exemplary embodiment of a system configuration management device according to the invention.

An exemplary embodiment of the invention will be described below with reference to the drawings. Each drawing describes the exemplary embodiment of the invention. The invention is not limited to the description of each drawing. The same number is attached to a similar configuration in each drawing, and repeated description thereof may be omitted.

In the drawings used in the following description, the description of the configuration of a part that does not relate to the description of the invention may be omitted and is sometimes not shown.

In the following description, each configuration transmits (outputs) information required for another configuration. Operations of the exemplary embodiment of the invention are not limited to the operations as described above. For example, the exemplary embodiment of the invention may include a storage unit (not shown). Each configuration may store generated (computed) information or received information in a storage unit, and may read information necessary for processing from the storage unit.

First Exemplary Embodiment

[Description of Configuration]

A first exemplary embodiment of the invention will now be described with reference to the drawings. FIG. 1 is a block diagram showing a configuration example of the first exemplary embodiment of a system configuration management device according to the invention.

A system configuration management device 100 of the exemplary embodiment generates an operation procedure for an operation of change of a deployment destination of a component, such as migration of a virtual machine in system building and configuration change by using input information in which a plan of changing a deployment destination is not specified.

The system configuration management device 100 of the exemplary embodiment can generate a procedure for change of a deployment destination, such as migration of a virtual machine, on the basis of simple input information. The system configuration management device 100 can also handle many types of system configuration change procedures.

As shown in FIG. 1, the system configuration management device 100 of the exemplary embodiment includes a constituent element computation unit 110, an identifier comparison unit 120, a comparison policy processing unit 130, a procedure planning unit 140, and a constituent element information database 150.

As shown in FIG. 1, the system configuration management device 100 receives current system configuration information and target system configuration information as input information. The system configuration management device 100 computes operation information required for configuration change on the basis of difference information on a target system among the difference information between the current system configuration information and the target system configuration information.

The system configuration management device 100 generates state model information in which operation information necessary for configuration change is modeled. The system configuration management device 100 generates configuration change procedure information on the basis of the generated state model information. The system configuration management device 100 outputs the generated configuration change procedure information.

Each constituent element of the system configuration management device 100 will now be described with reference to FIG. 1. In the description of each constituent element, related information will also be described with reference to the drawings.

The constituent element computation unit 110 will first be described. As shown in FIG. 1, the constituent element computation unit 110 acquires current system configuration information, target system configuration information, component information, constituent element detailed information, and comparison policy information.

A providing source of the current system configuration information, the target system configuration information, the component information, the constituent element detailed information, and the comparison policy information acquired by the constituent element computation unit 110 is not particularly limited.

For example, a user of the system configuration management device 100 may transmit each of the above-described pieces of information to the system configuration management device 100 via an input device (not shown). The user may directly input each of the above-described pieces of information into the system configuration management device 100 by operating the system configuration management device 100.

Figure 2:
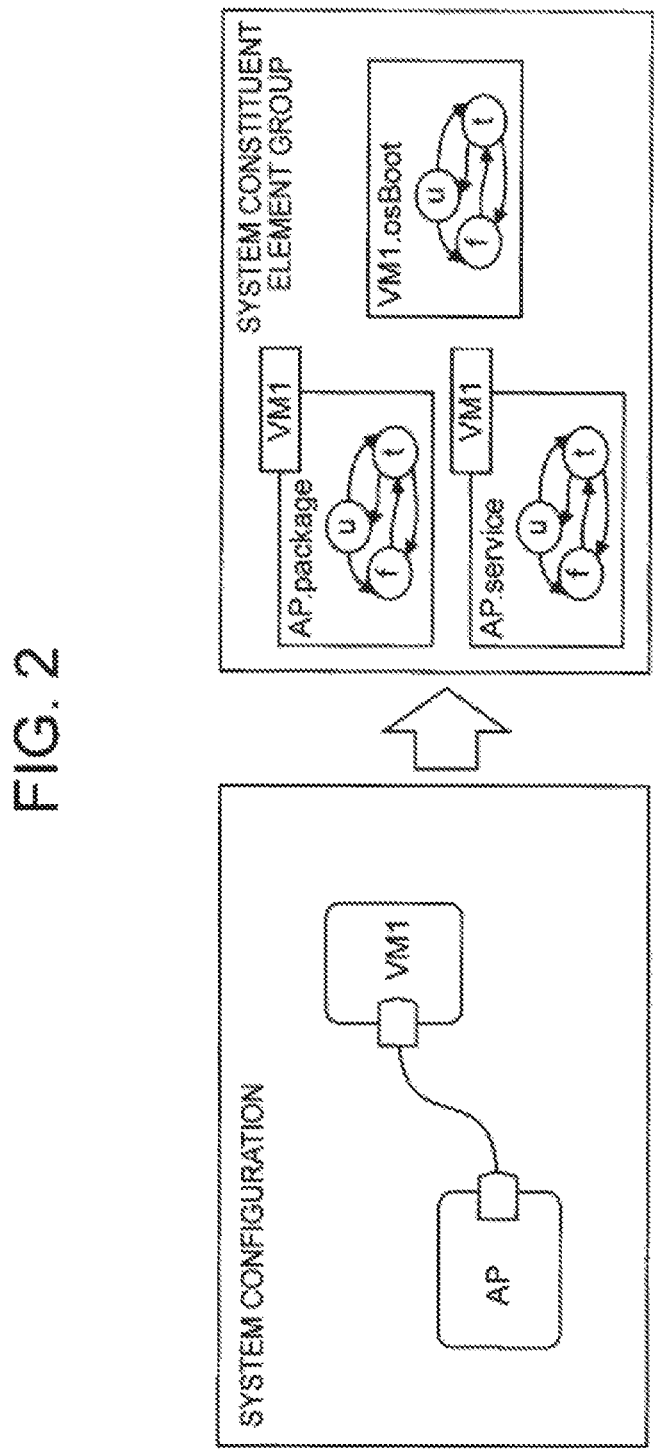
FIG. 2 is an explanatory diagram showing an example of constituent element computation processing performed by a constituent element computation unit 110 of the first exemplary embodiment.

The constituent element computation unit 110 has a function of computing a constituent element in a system and a variable value of the constituent element on the basis of the current system configuration information and the target system configuration information. FIG. 2 shows an example in which the constituent element computation unit 110 computes a constituent element. FIG. 2 is an explanatory diagram showing an example of constituent element computation processing performed by the constituent element computation unit 110 of the first exemplary embodiment.

As shown in FIG. 2, two components of a virtual machine VM1 and an application AP are described in system configuration information. A rounded quadrangle in the system configuration information in FIG. 2 represents the components.

The constituent element computation unit 110 lists constituent elements included in each component in the system configuration information with reference to the component information and the constituent element detailed information stored in the constituent element information database 150.

In the example in FIG. 2, the constituent element computation unit 110 lists a constituent element called osBoot from the component VM1. The constituent element computation unit 110 also lists a constituent element called package and a constituent element called service from the component AP. A rectangle in information of the system constituent element group in FIG. 2 represents the constituent element.

Note that, an identifier (ID) is given to each of the listed constituent elements. The ID of the exemplary embodiment is a character string obtained by coupling the name of a constituent element and the name of a component to which the constituent element belongs. For example, the ID of the constituent element osBoot belonging to the component VM1 in FIG. 2 is "VM1.osBoot". The character string in the rectangle representing the constituent element in FIG. 2 corresponds to the ID of the constituent element.

The constituent element computation unit 110 may also give a specific value indicated by set value information to the computed constituent element. For example, in order to reflect that fact that the component AP and the component VM1 are related to each other in the system configuration information, the constituent element computation unit 110 may give information that "the VM1 is an operation base" to the constituent element AP.package.

For example, "VM1" in the upper right rectangle of the constituent element AP.package and "VM1" in the upper right rectangle of the constituent element AP.service in FIG. 2 correspond to a specific value indicated by the set value information given to each of the constituent elements. For example, the constituent element computation unit 110 may give a specific value indicated by the set value information to a constituent element in the above-described information propagation processing method.

Information associated with the constituent element computation unit 110 will now be described. System configuration information will first be described.

The current system configuration information includes constituent elements including operation and a command necessary for configuration change and a variable value in an array format. FIG. 3 is an explanatory diagram showing an example of system configuration information of the first exemplary embodiment.

As shown in FIG. 3, the system configuration information is written in, for example, a domain specific language (DSL). The system configuration information may be written in, for example, JavaScript (registered trademark) Object Notation (JSON).

The upper of FIG. 3 shows current system configuration information. The lower of FIG. 3 shows target system configuration information in accordance with the current system configuration information in the upper of FIG. 3.

A system named "TargetSystem" is defined as a target system in the system configuration information in FIG. 3. A component of a system "TargetSystem" is described in the system configuration information in FIG. 3.

The current system configuration information of TargetSystem in the upper of FIG. 3 corresponds to the system configuration information in FIG. 2. That is, the component VM1 and the component AP are described in the current system configuration information in the upper of FIG. 3.

A set value or connection relation with another component is written in a part of each component. For example, as shown in the upper of FIG. 3, an Internet Protocol (IP) address (ip) and a virtual machine (VM) image ID (imageId) are described in the component VM1.

As shown in the upper of FIG. 3, connection relation between an interface called os and an interface called osAnsible of the component VM1 is described in the component AP. The connection relation may be propagated by, for example, the above-described information propagation processing method.

Each notation of the target system configuration information in the lower of FIG. 3 means the same as each notation corresponding to the above-described current system configuration information in the upper of FIG. 3.

The component information will now be described. FIG. 4 is an explanatory diagram showing an example of the component information of the first exemplary embodiment.

A template of a component called App, which has been used at the time of defining the component AP in the system configuration information in FIG. 3, is defined in the component information in FIG. 4. A variable value in the component and information on the constituent element are described in the component information in FIG. 4.

A variable that is used in a command for changing configuration and a constituent element in the component are respectively described as property and element in the component information App in FIG. 4. For example, a variable packageName represents the name of an application used at the time of activating service. A variable port represents a Transmission Control Protocol (TCP) port used in the service.

A constituent element package whose type is OSPackage and a constituent element service whose type is OSService are described in the component information App in FIG. 4. A specific variable value and dependency relation are described in each constituent element.

The variable port and the variable name are described in the constituent element service of the component information App in FIG. 4. A restriction that the constituent element service cannot perform state transition from a state f to a state t unless the constituent element package in in the state t is described in the constituent element service.

The state t of the constituent element package represents a state in which the package represented by package is installed. The state f and the state t of the constituent element service represent a state where the service represented by service is stopped and a state where the service represented by service is operating, respectively.

The description of "reference OS" in the component information App in FIG. 4 represents an interface of an operating system (OS) with another component. The constituent element package and the constituent element service are respectively registered in packages and services, which are OS interfaces, in "reference OS" in FIG. 4. Information may be propagated to another component by the registration, and the propagated information may be used for giving information indicating an execution base.

The constituent element detailed information will now be described. FIG. 5 is an explanatory diagram showing an example of the constituent element detailed information of the first exemplary embodiment.

A template of a constituent element is defined in the constituent element detailed information in FIG. 5. Information necessary for executing a command for changing configuration is described in the constituent element detailed information in FIG. 5.

For example, an argument and a variable passed to an execution command or a program are described as property in the constituent element detailed information in FIG. 5. For example, a variable port and a variable name are described in the constituent element detailed information OSService in the upper of FIG. 5.

The name of a command or a program that changes configuration on the basis of the constituent element detailed information or the path of a source code is described in agent. Note that the constituent element computation unit 110 may give a value to a specific component by setting an initial value of agent to null (undefined) and using the above-described information propagation method.

For example, in an example of the system configuration information in FIG. 2, the constituent element computation unit 110 may give information to the component VM1 so that agent Ansible is used for deployment to the VM1 after the constituent element AP.service in the component AP has been passed to the component VM1.

Note that a variable used in agent called Ansible may be collectively defined as property, as in the definition information of the constituent element detailed information Ansible in the lower of FIG. 5. That is, in the example in FIG. 2, the constituent element computation unit 110 is required to write definition information on agent having information of "hostName=VM1" in the component VM1, and to use a variable defined in agent so as to give information to a constituent element that has been assigned from the component AP by the above-described information propagation method.

As in the change plan system disclosed in PTL 1, a program for using the configuration management tool Ansible as agent in accordance with the state transition of a constituent element may be preliminarily generated.

The comparison policy information will now be described. FIG. 6 is an explanatory diagram showing an example of the comparison policy information of the first exemplary embodiment. FIG. 7 is an explanatory diagram showing another example of the comparison policy information of the first exemplary embodiment.

MergePolicy, which is comparison policy information used when a state element is generated on the basis of a pair of comparison constituent elements, is described in FIGS. 6 and 7. FIG. 6 shows mergePolicy named osServicePolicy. FIG. 7 shows mergePolicy named osFilePolicy.

OSService is described as a type of a constituent element that is a comparison target in osServicePolicy in FIG. 6. A conditional expression (condition) is described in osServicePolicy in FIG. 6.

As shown in FIG. 6, each property held by a constituent element (Before) in the current system configuration information and a constituent element (After) in the target system configuration information is described in condition. As shown in FIG. 6, a plurality of methods of generating a state element in accordance with a specific value set by property of agent is described.

The state element of the exemplary embodiment is a model obtained by giving information on a current state (current) and information on target state (require) to a constituent element. For example, when service is newly activated, the current state of a state element representing service is "f (state in which service is stopped)", and the target state of a state element representing the service is "t (the service is operating)".

An execution command for activating service is associated with information described in agent. The information described in agent in a program relates to, for example, state transition from the state f to the state t. Acquiring the execution order of state transition for all state elements to transition to target states corresponds to acquiring the procedure for changing configuration.

Values of property called hostName of each agent of the constituent element service (serviceBefore) in the current system configuration information and the constituent element service (serviceAfter) in the target system configuration information are compared in osServicePolicy in FIG. 6.

When hostNames are different ("!=" in FIG. 6), the comparison policy processing unit 130 generates state elements separately by Before and After ("element: different" in FIG. 6). The comparison policy processing unit 130 adds the generated state element to the state model information.

Figure 9:
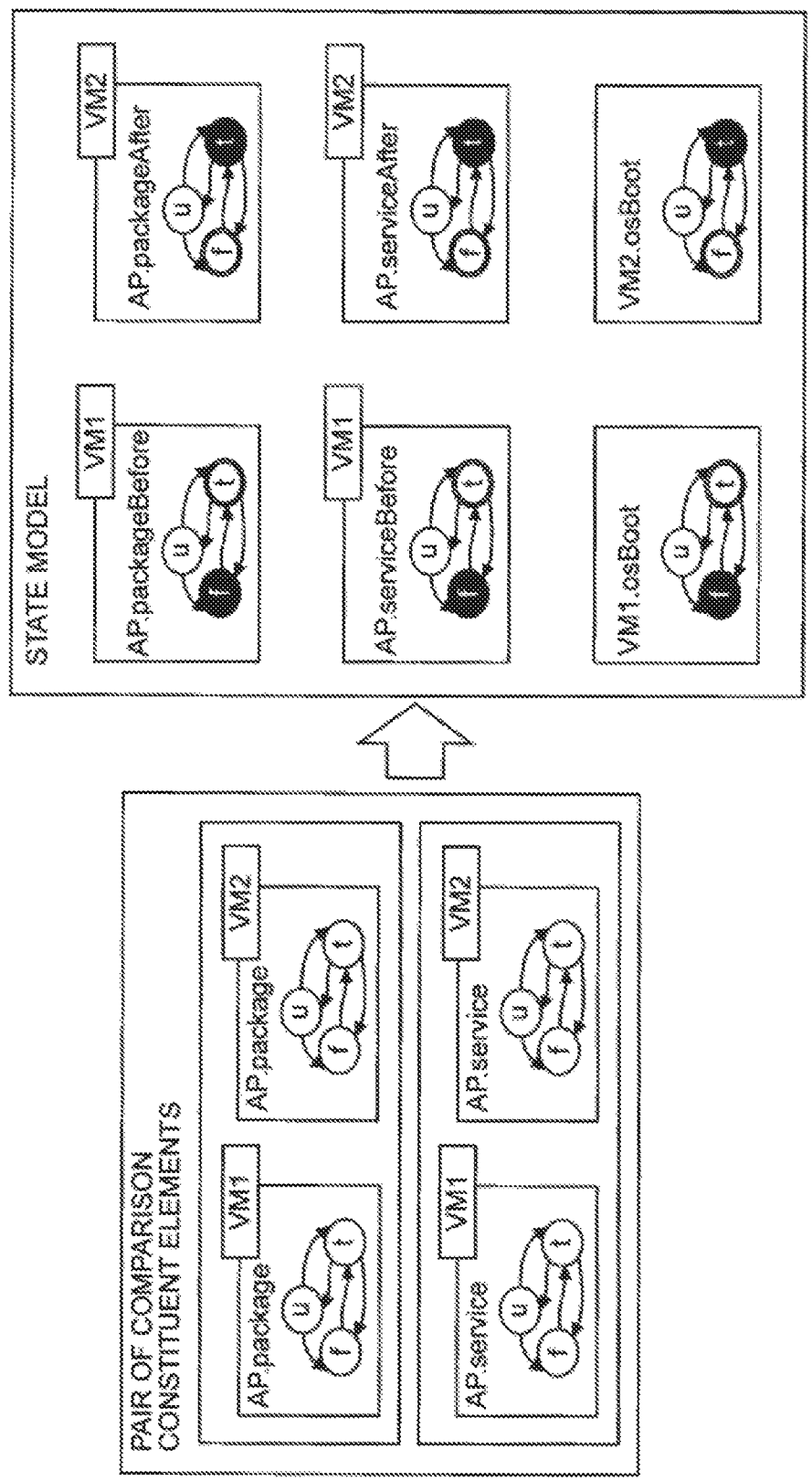
FIG. 9 is an explanatory diagram showing an example of state element generation processing performed by a comparison policy processing unit 130 of the first exemplary embodiment.

For example, AP.service, which is a pair of comparison constituent elements, is added in the state model information in FIG. 9 as two different state elements of AP.serviceBefore and AP.serviceAfter in accordance with the comparison policy information in FIG. 6. The reason of addition as the different state elements is that hostName of agent of AP.service is VM1 in a constituent element in the current system configuration information, VM2 in a constituent element in the target system configuration information, and hostNames are different between both.

The current state of each of the state elements added to the state model information in FIG. 9 corresponds to the state described in beforeStates in FIG. 6, and the target state of each of the state elements corresponds to the state described in afterStates. Specifically, the current state of a state element AP.serviceBefore is the state t, and the target state thereof is the state f. The current state of a state element AP.serviceAfter is the state f, and the target state thereof is the state t.

When hostName of agent of a constituent element in the current system configuration information is the same as hostName of agent of a constituent element in the target system configuration information, the comparison policy processing unit 130 adds one state element to the state model information ("element: same" in FIG. 6).

Note that each notation of the comparison policy information in FIG. 7 means the same as each notation corresponding to the above-described comparison policy information in FIG. 6.

The identifier comparison unit 120 will now be described with reference to FIG. 1. The identifier comparison unit 120 has functions of listing a pair of comparison constituent elements and adding a state element on the basis of a current system constituent element group and a target system constituent element group computed by the constituent element computation unit 110.

The identifier comparison unit 120 checks whether or not a constituent element having the same identifier as the identifier of each constituent element in the target system constituent element group is included in the current system constituent element group. When included, the identifier comparison unit 120 holds the corresponding two constituent elements as a pair of comparison constituent elements. When not included, the identifier comparison unit 120 adds a constituent element as a state element to the state model information.

Figure 8:
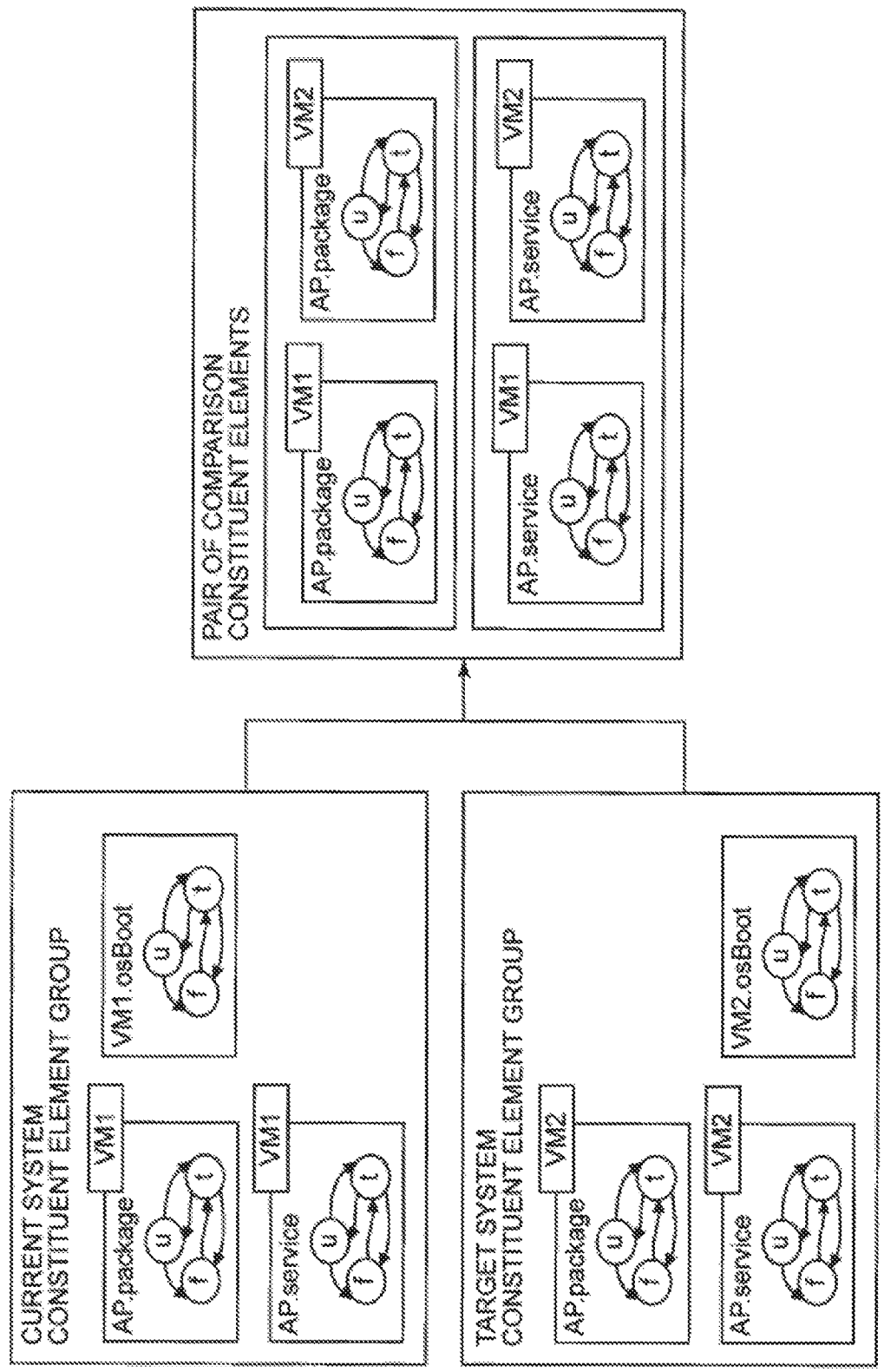
FIG. 8 is an explanatory diagram showing an example of processing of extracting a pair of comparison constituent elements performed by an identifier comparison unit 120 of the first exemplary embodiment.

FIG. 8 is an explanatory diagram showing an example of processing of extracting a pair of comparison constituent elements performed by the identifier comparison unit 120 of the first exemplary embodiment. The current system constituent element group in FIG. 8 includes a constituent element VM1.osBoot related to the operation and stop of the virtual machine VM1.

The current system constituent element group in FIG. 8 also includes a constituent element AP.package related to installation and uninstallation of a package to the application AP, and a constituent element AP.service related to the operation and stop of service provided by the application AP.

The target system constituent element group in FIG. 8 includes a constituent element VM2.osBoot related to the operation and stop of the virtual machine VM2. The target system constituent element group in FIG. 8 also includes a constituent element AP.package related to installation and uninstallation of a package to the application AP, and a constituent element AP.service related to the operation and stop of service provided by the application AP.

In the example in FIG. 8, the identifier comparison unit 120 detects the constituent element AP.package and the constituent element AP.service from both the system constituent element groups. An Identifier of the constituent elements AP.package and that of the constituent elements AP.service are the same in the current system constituent element group and the target system constituent element group. After the detection, the identifier comparison unit 120 lists two pairs of comparison constituent elements.

As shown in FIG. 8, the identifier comparison unit 120 describes each constituent element whose identifier is the same in the current system constituent element group and the target system constituent element group to each pair of comparison constituent elements. The constituent element VM1.osBoot and the constituent element VM2.osBoot, which are not included in the pair of comparison constituent elements, are added to the state model information.

The comparison policy processing unit 130 will now be described with reference to FIG. 1. The comparison policy processing unit 130 has a function of generating state model information on the basis of each pair of comparison constituent elements obtained at the identifier comparison unit 120. The comparison policy processing unit 130 regards the constituent elements as the same or separates the constituent elements in accordance with a rule described in the comparison policy information corresponding to each constituent element.

FIG. 9 is an explanatory diagram showing an example of state element generation processing performed by the comparison policy processing unit 130 of the first exemplary embodiment. In the example in FIG. 9, the comparison policy processing unit 130 generates a state element on the basis of the pair of comparison constituent elements in FIG. 8 listed by the identifier comparison unit 120. The comparison policy processing unit 130 also adds the generated state element to the state model information.

For example, the comparison policy processing unit 130 generates the state element AP.serviceBefore and the state element AP.serviceAfter in accordance with the comparison policy information of osServicePolicy in FIG. 6 on the basis of the pair of comparison constituent elements related to the constituent element AP.service. The generated state element is added to the state model information.

The constituent element AP.service in the current system constituent element group has a host name (hostName) of VM1 as a variable of agent. The constituent element AP.service in the target system constituent element group has a host name of VM2 as a variable of agent.

That is, since both host names are different, two state elements of the state element AP.serviceBefore and the state element AP.serviceAfter are added to the state model information. When the host names are the same, the comparison policy processing unit 130 adds one state element whose current state and target state are the state t to the state model information.

In the example in FIG. 8, the deployment destination of the AP is changed from VM1 to VM2. Comparison policy information similar to osServicePolicy is prepared in the constituent element information database 150 for the pair of comparison constituent elements related to AP.package. As shown in FIG. 9, the comparison policy processing unit 130 generates a state element AP.packageBefore and a state element AP.packageAfter according to the prepared comparison policy information.

The state element VM1.osBoot and the state element VM2.osBoot described in the state model information in FIG. 9 are generated by the identifier comparison unit 120 in the process of processing of extracting a pair of comparison constituent elements in FIG. 8.

The procedure planning unit 140 will now be described with reference to FIG. 1. The procedure planning unit 140 has a function of deriving a procedure for changing the configuration of a system without causing failure by using the state model information as an input. The procedure planning unit 140 outputs configuration change procedure information indicating the derived procedure. The procedure planning unit 140 may have a function similar to the function of a route search unit described in PTL 1.

The system configuration management device 100 according to the exemplary embodiment includes the constituent element computation unit 110 that compute a constituent element including specific operation command information necessary for changing configuration from system configuration information by using current system configuration information and target system configuration information of a target system as inputs.

The identifier comparison unit 120 in the system configuration management device 100 compares an identifier of a constituent element in the current system configuration information to an identifier of a constituent element in the target system configuration information, and lists a constituent element whose identifier is the same in the current system configuration information and the target system configuration information as the pair of comparison constituent elements. The identifier comparison unit 120 adds a constituent element that exists only in either the current system configuration information or the target system configuration information to the state model information as a state element.

The system configuration management device 100 includes the comparison policy processing unit 130 that generates a state element necessary for deriving the execution order of a procedure with reference to the comparison policy information corresponding to each constituent element on the basis of the pair of comparison constituent elements, and that adds the generated state element to the state model information. The system configuration management device 100 includes a procedure planning unit 140 that derives the execution order of a procedure by searching each state of the state elements described in the state model information.

[Description of Operation]

Figure 10:
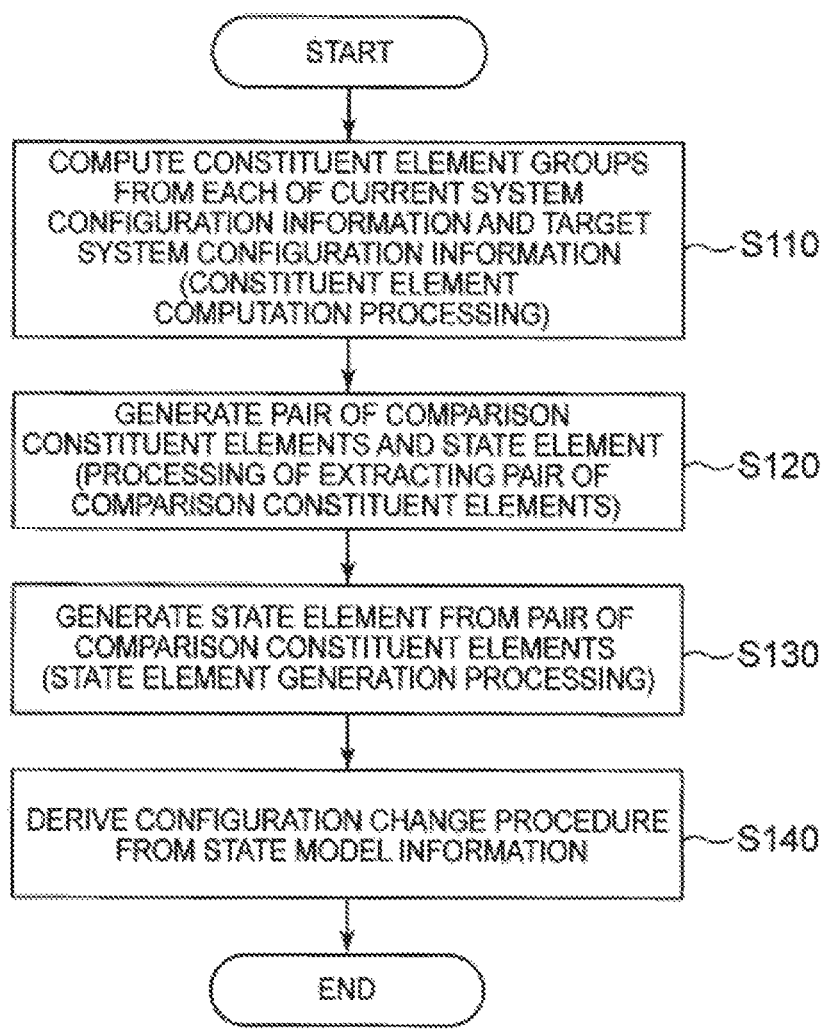
FIG. 10 is a flowchart showing the entire operation of configuration change procedure deriving processing performed by a system configuration management device 100 of the first exemplary embodiment.

Operation of deriving a procedure for changing the configuration of the system configuration management device 100 of the exemplary embodiment will be described below with reference to FIGS. 10 to 13. FIG. 10 is a flowchart showing the entire operation of configuration change procedure deriving processing performed by the system configuration management device 100 of the first exemplary embodiment.

First, the constituent element computation unit 110 of the system configuration management device 100 computes a current system constituent element group and a target system constituent element group respectively from the current system configuration information and the target system configuration information (Step S110).

The identifier comparison unit 120 compares the current system constituent element group to the target system constituent element group, and adds a pair of constituent elements whose identifiers are the same to a group of pairs of comparison constituent elements. The identifier comparison unit 120 adds a constituent element included only in any system constituent element group to the state model information as a state element (Step S120).

The comparison policy processing unit 130 generates a state element on the basis of all pairs of comparison constituent elements. The comparison policy processing unit 130 adds the generated state element to the state model information (Step S130).

The procedure planning unit 140 derives a configuration change procedure, which is a procedure for changing current system configuration to target system configuration, by using the state model information as an input (Step S140). The procedure planning unit 140 then outputs information indicating the configuration change procedure. After the output, the system configuration management device 100 ends the configuration change procedure deriving processing.

Figure 11:
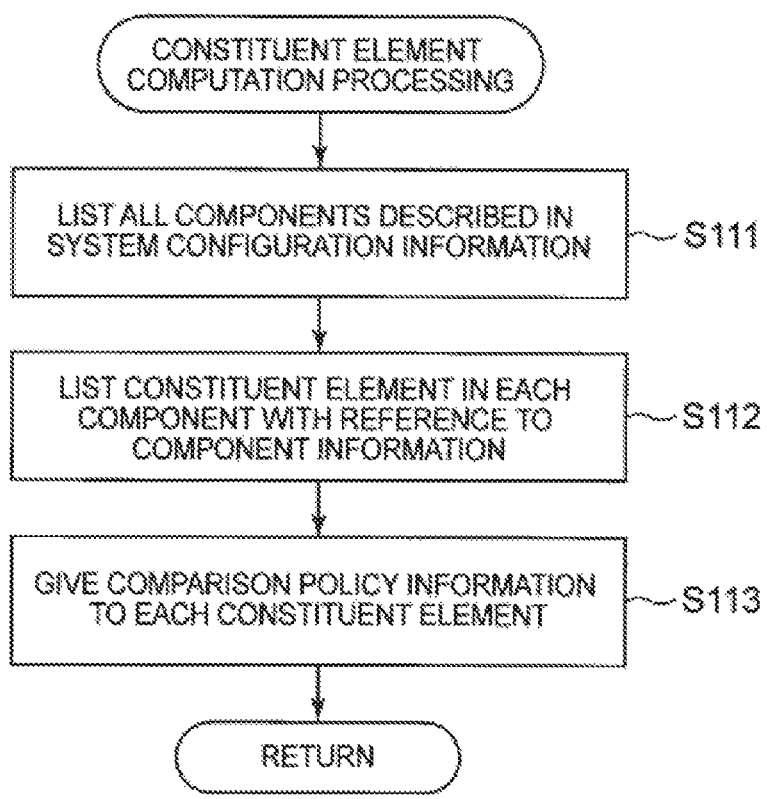
FIG. 11 is a flowchart showing the operation of the constituent element computation processing performed by the constituent element computation unit 110 of the first exemplary embodiment.

Each of pieces of sub-processing constituting the configuration change procedure deriving processing will now be described. Operation of computing a constituent element of the constituent element computation unit 110 will first be described with reference to FIG. 11. FIG. 11 is a flowchart showing the operation of the constituent element computation processing performed by the constituent element computation unit 110 of the first exemplary embodiment. Note that the constituent element computation processing in FIG. 11 corresponds to the processing of Step S110 in FIG. 10.

First, the constituent element computation unit 110 lists all components in each piece of system configuration information by using current system configuration information and target system configuration information as inputs (Step S111).

The constituent element computation unit 110 lists a constituent element in each listed component with reference to component information (Step S112).

The constituent element computation unit 110 gives setting information and comparison policy information to each listed constituent element (Step S113). As a result, the constituent element computation unit 110 computes each of the current system constituent element group and the target system constituent element group. After the computation, the constituent element computation unit 110 ends the constituent element computation processing.

Figure 12:
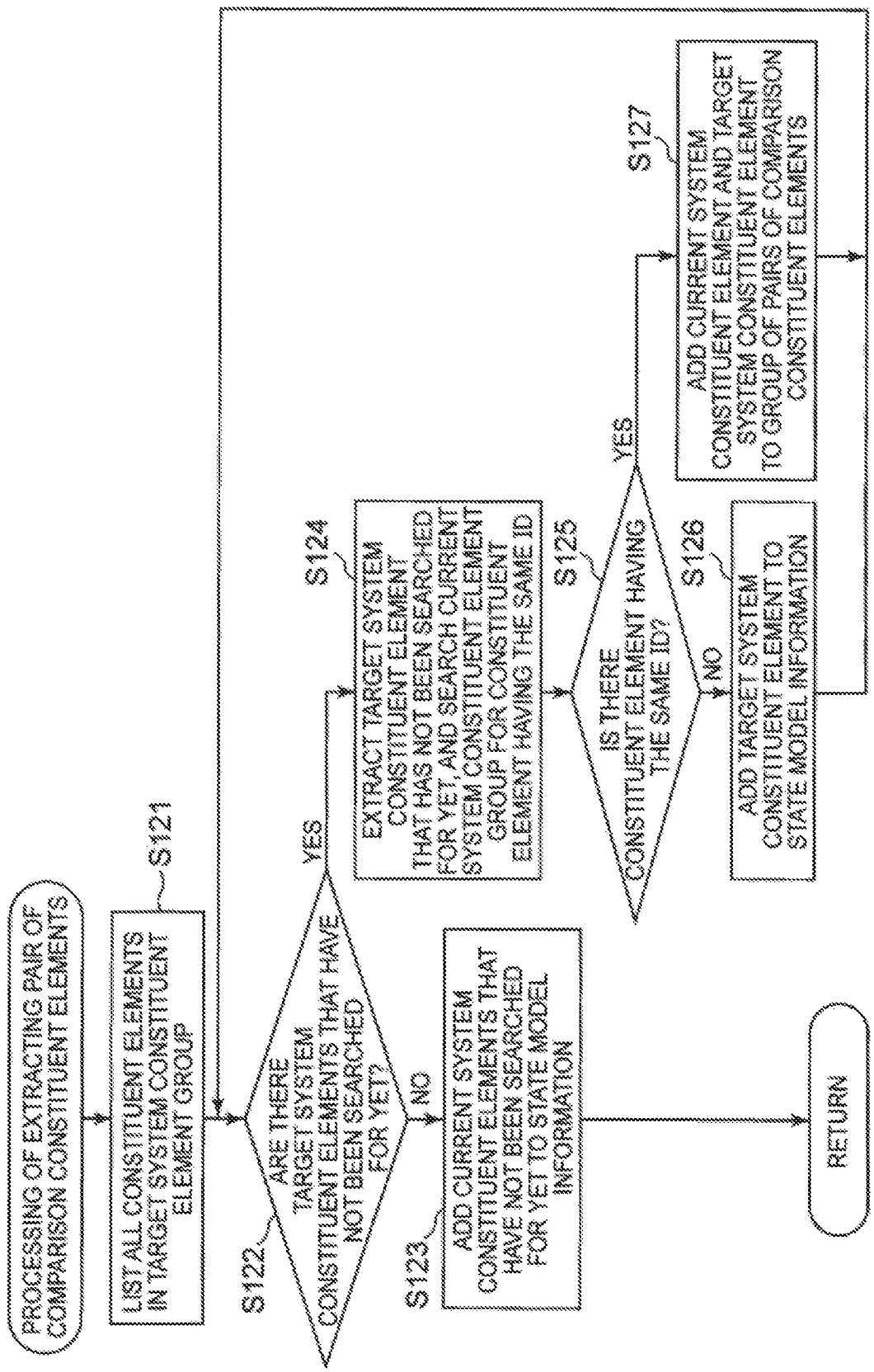
FIG. 12 is a flowchart showing the operation of the processing of extracting a pair of comparison constituent elements performed by the identifier comparison unit 120 of the first exemplary embodiment.

Operation of the identifier comparison unit 120 extracting a pair of comparison constituent elements will now be described with reference to FIG. 12. FIG. 12 is a flowchart showing the operation of processing of extracting a pair of comparison constituent elements performed by the identifier comparison unit 120 of the first exemplary embodiment. Note that processing of extracting a pair of comparison constituent elements in FIG. 12 corresponds to the processing of Step S120 in FIG. 10.

First, the identifier comparison unit 120 lists all target system constituent elements, which are constituent elements in the target system constituent element group (Step S121).

The identifier comparison unit 120 checks whether there are target system constituent elements that have not been searched for yet (Step S122). When there are target system constituent elements that have not been searched for yet (Yes in Step S122), the identifier comparison unit 120 extracts one target system constituent element that has not been searched for yet.

The identifier comparison unit 120 searches constituent elements in the current system constituent element group for a constituent element having the same ID as that of the extracted target system constituent element (Step S124).

When a constituent element having the same ID is searched for (Yes in Step S125), the identifier comparison unit 120 brings together the current system constituent element and the target system constituent element, which have the same ID, as one pair of comparison constituent elements, and adds the pair to a group of pairs of comparison constituent elements (Step S127). After the addition, the identifier comparison unit 120 performs the processing of Step S122.

When no constituent element having the same ID is searched for (No in Step S125), the identifier comparison unit 120 adds the extracted target system constituent element to state model information (Step S126). After the addition, the identifier comparison unit 120 performs the processing of Step S122.

The identifier comparison unit 120 repeatedly performs the processing of Steps S124 to S127 until there is no target system constituent element that has not been searched for yet.

When there is no target system constituent element that has not been searched for yet (No in Step S122), the identifier comparison unit 120 adds all the current system constituent elements that have not been searched for in Step S124 to the state model information as state elements (Step S123). After the addition, the identifier comparison unit 120 ends the processing of extracting a pair of comparison constituent elements.

Figure 13:
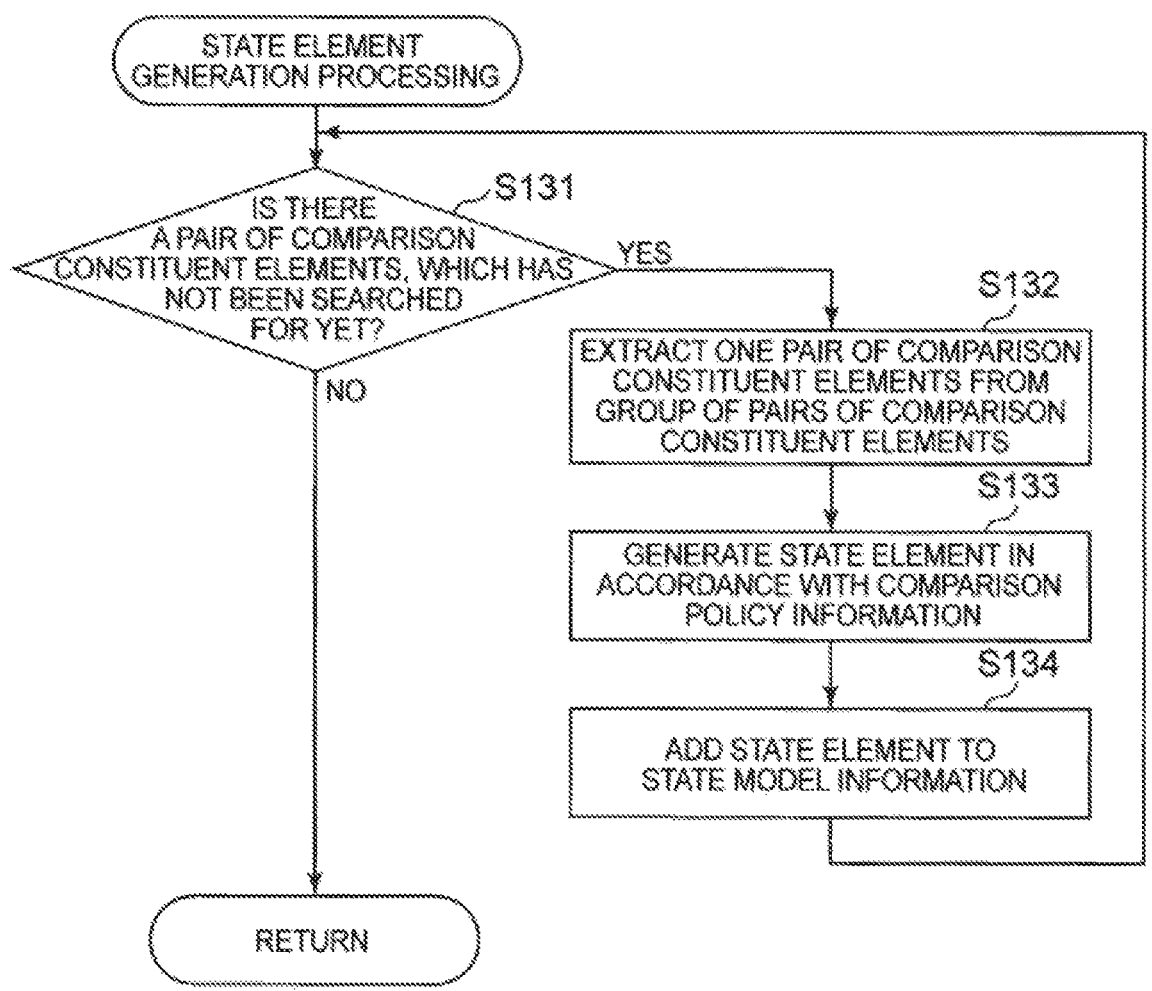
FIG. 13 is a flowchart showing the operation of the state element generation processing performed by the comparison policy processing unit 130 of the first exemplary embodiment.

Operation of the comparison policy processing unit 130 generating a state element will now be described with reference to FIG. 13. FIG. 13 is a flowchart showing the operation of state element generation processing performed by the comparison policy processing unit 130 of the first exemplary embodiment. Note that the state element generation processing in FIG. 13 corresponds to the processing of Step S130 in FIG. 10.

First, the comparison policy processing unit 130 checks whether or not there is a pair of comparison constituent elements that has not been searched for yet among all pairs of comparison constituent elements computed by the identifier comparison unit 120 (Step S131).

When there are pairs of comparison constituent elements that have not been searched for yet (Yes in Step S131), the comparison policy processing unit 130 extracts corresponding one pair of comparison constituent elements from the group of pairs of comparison constituent elements (Step S132).

The comparison policy processing unit 130 generates a state element on the basis of the pair of comparison constituent elements extracted in accordance with the comparison policy information (Step S133). The comparison policy processing unit 130 adds the state element generated in Step S133 to the state model information (Step S134).

The comparison policy processing unit 130 repeatedly performs the processing of Steps S132 to S134 until there is no pair of comparison constituent elements that has not been searched for yet. When there is no pair of comparison constituent elements that has not been searched for yet (No in Step S131), the comparison policy processing unit 130 ends the state element generation processing.

[Description of Effects]

The effects of the first exemplary embodiment will be described below. The system configuration management device 100 according to the exemplary embodiment includes the constituent element computation unit 110 that computes a constituent element including specific operation command information necessary for changing configuration from system configuration information by using current system configuration information and target system configuration information of a target system as inputs.

The identifier comparison unit 120 in the system configuration management device 100 compares an identifier of a constituent element in the current system configuration information to an identifier of a constituent element in the target system configuration information, and lists a constituent element whose identifier is the same in the current system configuration information and the target system configuration information as the pair of comparison constituent elements. The identifier comparison unit 120 adds a constituent element that exists only in either the current system configuration information or the target system configuration information to the state model information as a state element.

The system configuration management device 100 includes the comparison policy processing unit 130 that generates a state element necessary for deriving the execution order of a procedure with reference to the comparison policy information corresponding to each constituent element on the basis of the pair of comparison constituent elements, and that adds the generated state element to the state model information. The system configuration management device 100 includes a procedure planning unit 140 that derives the execution order of a procedure by searching each state of the state elements described in the state model information.

As described above, the system configuration management device 100 can generate, for example, an execution command group for change from a current system configuration to a target system configuration and configuration change procedure information in which a correct order of executing the execution command is described, on the basis of the current system configuration information and the target system configuration information without manual intervention.

Specifically, the constituent element computation unit 110 computes a constituent element in each system on the basis of the current system configuration information, the target system configuration information, the constituent element detailed information, the component information, and the comparison policy information.

The identifier comparison unit 120 compares the identifier of the current system constituent element to that of the target system constituent element, and adds the constituent element that exists only in either the current system or the target system to the state model information. The identifier comparison unit 120 lists pairs of comparison constituent elements, for which a method of import for procedure search to a state model is undetermined, as a group of pairs of comparison constituent elements.

The comparison policy processing unit 130 generates a state element representing redeployment of an application from the group of pairs of comparison constituent elements in accordance with the comparison policy information. The comparison policy processing unit 130 adds the generated state element to the state model information.

That is, the comparison policy processing unit 130 can generate an appropriate state model that handles the case where, for example, an application is redeployed to a different deployment destination. The procedure planning unit 140 can generate configuration change procedure information on the basis of the generated state model.

The system configuration management device 100 according to the exemplary embodiment can derive a procedure for moving, for example, software and a file to a deployment destination such as a different physical machine, virtual machine, and a cloud base by using target system configuration information whose reference information of a component has been changed as an input.

The system configuration management device 100 of the exemplary embodiment can generate a procedure for change of a deployment destination of a machine, such as migration of a virtual machine, on the basis of simple input information. The system configuration management device 100 can also handle many types of components.

The system configuration management device 100 of the exemplary embodiment can simplify input information necessary for deriving a procedure for change of a deployment destination, such as migration of a virtual machine. This is because the identifier comparison unit 120 and the comparison policy processing unit 130 can automatically generate a state model necessary for procedure search on the basis of the input information by using information stored in the constituent element information database 150.

An operation administrator who uses the system configuration management device 100 of the exemplary embodiment can derive a redeployment procedure without being conscious of whether or not the deployment destination of an application is changed at the time of system configuration change after the current system configuration and target system configuration have been independently generated.

Figure 14:
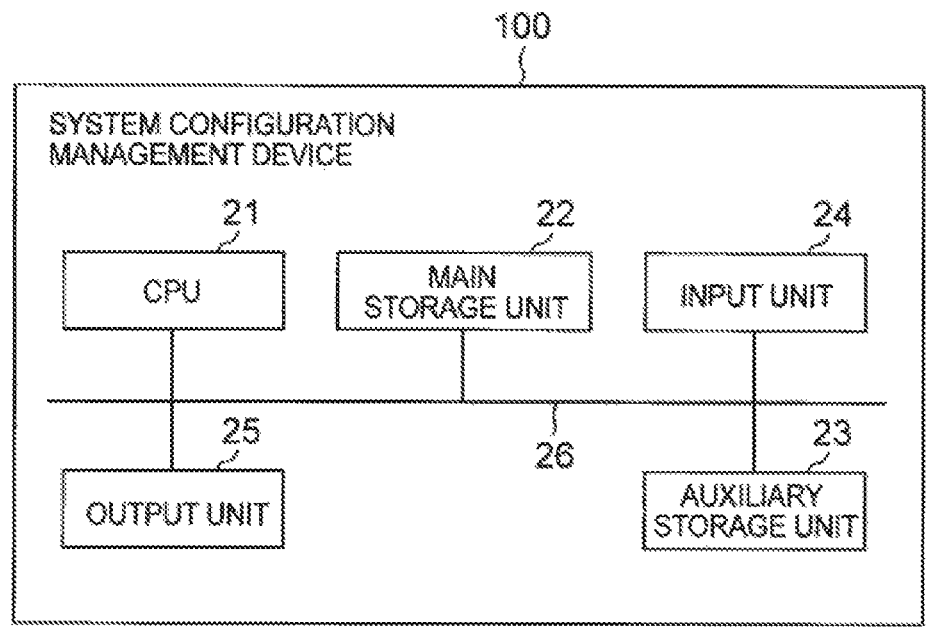
FIG. 14 is an explanatory diagram showing an example of the hardware configuration of a system configuration management device according to the invention.

A specific example of the hardware configuration of the system configuration management device 100 of the exemplary embodiment will be described below. FIG. 14 is an explanatory diagram showing an example of the hardware configuration of the system configuration management device according to the invention.

The system configuration management device 100 in FIG. 14 includes a central processing unit (CPU) 21, a main storage unit 22, and an auxiliary storage unit 23. The system configuration management device 100 may also include an input unit 24 and an output unit 25. The input unit 24 is used for user operation. The output unit 25 is used for presenting a processing result or the progress of a processing content to the user.

The system configuration management device 100 in FIG. 14 may include a digital signal processor (DSP) instead of the CPU 21. Alternatively, the system configuration management device 100 in FIG. 14 may include both the CPU 21 and the DSP.

The main storage unit 22 is used as a data work area and a temporary data saving area. The main storage unit 22 is, for example, a random access memory (RAM).

The auxiliary storage unit 23 is a non-temporary tangible storage medium. Examples of the non-temporary tangible storage medium include, for example, a magnetic disk, a magneto-optical disk, a compact disk read only memory (CD-ROM), a digital versatile disk read only memory (DVD-ROM), and a semiconductor memory.

The input unit 24 has a function of inputting data and a processing instruction. The input unit 24 is an input device such as a keyboard or a mouse.

The output unit 25 has a function of outputting data. For example, the output unit 25 is a display device, such as a liquid crystal display device, or a printing device such as a printer.

As shown in FIG. 14, each constituent element is connected to a system bus 26 in the system configuration management device 100.

The auxiliary storage unit 23 stores, for example, programs for implementing the constituent element computation unit 110, the identifier comparison unit 120, the comparison policy processing unit 130, and the procedure planning unit 140.

Note that the system configuration management device 100 of the exemplary embodiment may be implemented by, for example, the CPU 21 that executes processing in accordance with a program stored in a non-temporary storage medium. That is, the system configuration management device 100 of the exemplary embodiment may be implemented by software.

When implemented by software, each function is implemented by software by the CPU 21 loading and executing a program stored in the auxiliary storage unit 23 in the main storage unit 22, and controlling the operation of the system configuration management device 100. That is, the constituent element computation unit 110, the identifier comparison unit 120, the comparison policy processing unit 130, and the procedure planning unit 140 are implemented by, for example, the CPU 21 that executes processing under program control.

The constituent element information database 150 may be implemented by, for example, a RAM.

Part or all of each constituent element may be implemented by, for example, general-purpose circuitry, dedicated circuitry, a processor, or a combination thereof. These may be configured by a single chip, or may be configured by a plurality of chips connected via a bus. Part or all of each constituent element may be implemented by a combination of, for example, the above-described circuitry and a program.

For example, each unit in the system configuration management device 100 of the exemplary embodiment may be implemented by hardware circuitry. In an example, each of the constituent element computation unit 110, the identifier comparison unit 120, the comparison policy processing unit 130, the procedure planning unit 140, and the constituent element information database 150 is implemented by a large scale integration (LSI). These may be implemented by one LSI.

When part or all of each constituent element is implemented by, for example, a plurality of information processing devices or circuitry, the plurality of information processing devices or circuitry may be centrally disposed or decentrally disposed. For example, the information processing device and the circuitry may be implemented in a form in which, for example, a client-and-server system and a cloud computing system, each component are connected via a communication network.

Figure 15:
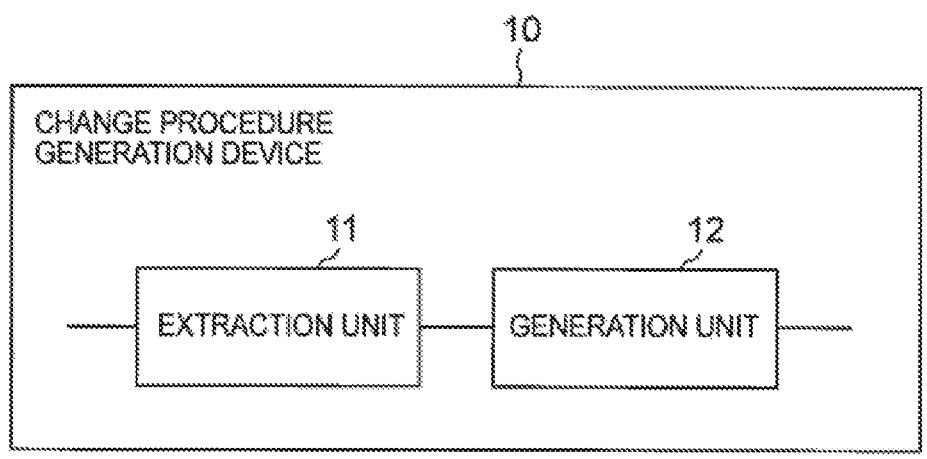
FIG. 15 is a block diagram outlining a change procedure generation device according to the invention.

The invention will now be outlined. FIG. 15 is a block diagram outlining a change procedure generation device according to the invention. A change procedure generation device 10 according to the invention includes: an extraction unit 11 (e.g., identifier comparison unit 120) that inputs first configuration information, which is information indicating the configuration before a change of a system to be changed, and second configuration information, which is information indicating the change target configuration of the system to be changed, and extracts constituent elements of the system to be changed, which are included in both the first configuration information and the second configuration information, from the first configuration information and the second configuration information, respectively; and a generation unit 12 (e.g., comparison policy processing unit 130) that generates state elements representing respective states of the two constituent elements according to a predetermined condition on the basis of the two extracted constituent elements.

Such configuration enables the change procedure generation device to generate a procedure for changing system configuration on the basis of simple input information. For example, the change procedure generation device can generate a procedure for changing the deployment destination of a machine.

Each of the two constituent elements has a variable specified according to the predetermined condition. The generation unit 12 may generate two state elements on the basis of the two constituent elements having different variable values, and generate one state element on the basis of the two constituent elements having the same variable value.

Such configuration enables the change procedure generation device to reduce the number of generated state elements.

The extraction unit 11 may generate a state element representing the state of a constituent element on the basis of the constituent element of the system to be changed. The constituent element is included only in either the first configuration information or the second configuration information.

Such configuration enables the change procedure generation device to generate a state element on the basis of all constituent elements in each configuration information.

The change procedure generation device 10 may further include a planning unit (e.g., procedure planning unit 140) that plans a procedure for causing a state of a state element to transition from a current state to a target state on the basis of a state model including a state element generated at the generation unit 12 and the state element generated at the extraction unit 11.

Such configuration enables the change procedure generation device to derive a procedure for changing the configuration of a system to be changed.

The change procedure generation device 10 may further include a computation unit (e.g. constituent element computation unit 110) that computes each of a first constituent element group and a second constituent element group by using the first configuration information and the second configuration information as inputs, the first constituent element group being a collection of constituent elements, included in the first configuration information, of the system to be changed, the second constituent element group being a collection of constituent elements, included in the second configuration information, of the system to be changed, in which the computation unit may input the computed first constituent element group and the computed second constituent element group to the extraction unit 11.

Such configuration enables the change procedure generation device to more easily extract a pair of constituent elements having the same identifier.

The change procedure generation device 10 may further includes a storage unit (e.g., constituent element information database 150) that stores constituent element information related to a constituent element of the system to be changed, in which the computation unit may compute each of the first constituent element group and the second constituent element group on the basis of the stored constituent element information.

Such configuration enables the change procedure generation device to compute a constituent element group on the basis of the constituent element detailed information and the component information.

Although the invention has been described above with reference to the exemplary embodiments and examples, the invention is not limited to the above-described exemplary embodiments and the examples. Various changes that can be understood by those skilled in the art can be made to the configuration and details of the invention within the scope of the invention.

This application claims priority based on Japanese Patent Application Laid-Open No. 2017-116729 filed on Jun. 14, 2017, the entire disclosure of which is incorporated herein.

INDUSTRIAL APPLICABILITY

The invention is suitably applied to an application of generating a correct execution order of, for example, commands, programs, and scripts that are executed when middleware and application software are redeployed to a deployment destination different from the current deployment destination.

REFERENCE SIGNS LIST

10 Change procedure generation device
11 Extraction unit
12 Generation unit
21 CPU
22 Main storage unit
23 Auxiliary storage unit
24 Input unit
25 Output unit
26 System bus
100 System configuration management device
110 Constituent element computation unit
120 Identifier comparison unit
130 Comparison policy processing unit
140 Procedure planning unit
150 Constituent element information database

What is claimed is:

1. A change procedure generation device comprising:

an extraction unit, implemented by a hardware including one or more processors, which inputs first configuration information indicating a configuration of a system to be changed before a change to the system, and second configuration information indicating a change target configuration of the system to be changed after the change to the system, and extracts constituent elements of the system to be changed, which are included in both the first configuration information and the second configuration information, from the first configuration information and the second configuration information, respectively;

a generation unit, implemented by the hardware, which generates first and second state elements respectively representing first and second states of first and second constituent elements of the extracted constituent elements according to a predetermined condition based on the first and second constituent elements, wherein each of the two constituent elements has a variable specified according to the predetermined condition, and the generation unit differently generates the first state element based on the first and second constituent elements having different variable values, and generates the second state element based on the first and second constituent elements having a same variable value; and a planning unit, implemented by the hardware, to generate and execute a procedure changing the first and second constituent elements of the system extracted from the extraction unit from a current state to a target state, based on the first and second state elements differently generated by the generation unit, the system correspondingly changing from the configuration indicated by the first configuration information to the change target configuration indicated by the second configuration information.

2. The change procedure generation device according to claim 1, further comprising a computation unit implemented by the hardware, which computes each of a first constituent element group and a second constituent element group by using the first configuration information and the second configuration information as inputs, the first constituent element group being a first collection of the constituent elements included in the first configuration information, the second constituent element group being a second collection of the constituent elements included in the second configuration information, wherein the computation unit inputs the computed first constituent element group and the computed second constituent element group to the extraction unit.

3. The change procedure generation device according to claim 2, further comprising a storage unit implemented by the hardware, which stores corresponding constituent element information related to a given constituent element of the system to be changed, wherein the computation unit computes each of the first constituent element group and the second constituent element group based on the given constituent element information.

4. A computer-implemented change procedure generation method comprising:

inputting first configuration information indicating a configuration of a system to be changed before a change to the system, and second configuration information indicating a change target configuration of the system to be changed after the change to the system, extracting constituent elements of the system to be changed, which are included in both the first configuration information and the second configuration information, from the first configuration information and the second configuration information, respectively;

generating first and second state elements respectively representing first and second states of first and second constituent elements of the extracted constituent elements according to a predetermined condition based on the first and second constituent elements, wherein each of the two constituent elements has a variable specified according to the predetermined condition, generating the first and second state elements comprises differently generating the first state element based on the first and second constituent two constituent elements having-different variable values, and generating the second state element based on the first and second constituent elements have a same variable value; and generating and executing a procedure changing the first and second constituent elements of the system that have been extracted from a current state to a target state, based on the first and second state elements that have been differently generated, the system correspondingly changing from the configuration indicated by the first configuration information to the change target configuration indicated by the second configuration information.

5. A non-transitory computer-readable capturing medium having captured therein a change procedure generation program causing a computer to perform processing comprising:

inputting first configuration information indicating a configuration of a system to be changed before a change to the system, and second configuration information indicating a change target configuration of the system to be changed after the change to the system, extracting constituent elements of the system to be changed, which are included in both the first configuration information and the second configuration information, from the first configuration information and the second configuration information, respectively;

generating first and second state elements respectively representing first and second states of first and second constituent elements of the extracted constituent elements according to a predetermined condition based on the first and second constituent elements, wherein each of the two constituent elements has a variable specified according to the predetermined condition, generating the first and second state elements comprises differently generating the first state element based on the first and second constituent two constituent elements having-different variable values, and generating the second state element based on the first and second constituent elements have a same variable value; and generating and executing a procedure changing the first and second constituent elements of the system that have been extracted from a current state to a target state, based on the first and second state elements that have been differently generated, the system correspondingly changing from the configuration indicated by the first configuration information to the change target configuration indicated by the second configuration information.

* * * * *